(12) United States Patent
Usami

(10) Patent No.: US 8,199,368 B2
(45) Date of Patent: Jun. 12, 2012

(54) IMAGE DATA CORRECTING APPARATUS, COMPUTER-READABLE IMAGE DATA CORRECTING PROGRAM STORAGE MEDIUM, IMAGE DATA CORRECTING METHOD AND PRINTING SYSTEM

(75) Inventor: Yoshinori Usami, Minato-ku (JP)

(73) Assignee: FUJIFILM Corporation, Tokyo (JP)

( * ) Notice: Subject to any disclaimer, the term of this patent is extended or adjusted under 35 U.S.C. 154(b) by 818 days.

(21) Appl. No.: 12/263,837

(22) Filed: Nov. 3, 2008

(65) Prior Publication Data

US 2009/0116048 A1    May 7, 2009

(30) Foreign Application Priority Data

Nov. 2, 2007   (JP) .................................. 2007-286467

(51) Int. Cl.
*H04N 1/405* (2006.01)
(52) U.S. Cl. .................. 358/3.26; 358/3.1; 358/504
(58) Field of Classification Search .............. 358/1.9, 358/2.1, 3.1–3.12, 3.21, 3.24–3.26, 504, 358/406, 520–531, 468
See application file for complete search history.

(56) References Cited

U.S. PATENT DOCUMENTS

| | | | | |
|---|---|---|---|---|
| 5,132,788 | A | * | 7/1992 | Hirota ........................... 358/517 |
| 6,954,549 | B2 | * | 10/2005 | Kraft ............................ 382/167 |
| 2005/0083346 | A1 | | 4/2005 | Takahashi et al. |
| 2005/0212814 | A1 | | 9/2005 | Kubo |
| 2006/0066925 | A1 | | 3/2006 | Hasegawa et al. |

FOREIGN PATENT DOCUMENTS

| | | |
|---|---|---|
| EP | 0 488 412 A2 | 6/1992 |
| EP | 0 810 777 A2 | 12/1997 |
| EP | 1 294 177 A2 | 3/2003 |
| EP | 1 531 616 A2 | 5/2005 |
| JP | 2001-347645 A | 12/2001 |
| JP | 2004-106523 A | 4/2004 |
| JP | 2006-094297 A | 4/2006 |

OTHER PUBLICATIONS

Communication pursuant to Article 94(3) EPC, dated Nov. 8, 2010, issued in corresponding EP Application No. 08 018 917.8, 9 pages.
EP Communication, dated Aug. 5, 2009, issued in corresponding EP Application No. 08018917.8, 9 pages.
Notification of Reasons for Refusal, dated Oct. 4, 2011, issued in corresponding JP Application No. 2007-286467, 5 pages in English and Japanese.

* cited by examiner

*Primary Examiner* — Thomas D Lee
*Assistant Examiner* — Stephen M Brinich
(74) *Attorney, Agent, or Firm* — Sughrue Mion, PLLC

(57) ABSTRACT

An image data correcting apparatus includes: an image data obtaining section that obtains print image data representing a print image; an area designation receiving section that receives a designating operation to designate an area in the print image represented by the print image data; a density adjusting section that has an adjustment value designated through an operation for the printing density; a change estimating section that estimates a change in a print color in the printing system that is caused by the adjustment of the printing density with the use of the adjustment value; and a data correcting section that corrects the print image data to cancel the change estimated by the change estimating section in the area other than the designated region in the print image.

20 Claims, 8 Drawing Sheets

IMAGE DATA CORRECTING APPARATUS, COMPUTER-READABLE IMAGE DATA CORRECTING PROGRAM STORAGE MEDIUM, IMAGE DATA CORRECTING METHOD AND PRINTING SYSTEM

BACKGROUND OF THE INVENTION

1. Field of the Invention

The present invention relates to a data correcting apparatus that corrects print image data representing a print image to be printed by a printing system, and to a computer-readable data correcting program storage medium.

2. Description of the Related Art

In the field of printing, a print image is conventionally formed in the following manner. An image is first edited with the use of a personal computer or the like, and a film original plate is produced based on the edited image. Based on the film original plate, a printing plate is formed, and is mounted to a printing machine. Ink is then applied to the printing plate, and the applied ink is transferred onto a printing paper sheet. In recent years, a CTP (Computer To Plate) that burns an image directly into a printing plate is incorporated into a printing machine to form a digital printing machine that automatically carries out complicated plate producing procedures that used to require a highly-skilled worker. In this trend, there is an increasing demand for a printing machine for fewer lots and more variety to produce various kinds of printed materials in fewer lots than in a case of a conventional printing machine.

The series of procedures to be carried out to perform printing on paper sheets involve the troublesome process of printing hundreds of copies at one time, and therefore, are time-consuming and costly. To counter this problem, a proof image showing an image to be printed is formed by a printer or the like that is easier to handle than a printing machine prior to performing actual printing. The image to be printed is checked in advance through the proof image. In recent years, soft proof is conducted by displaying a proof image on a calibrated monitor, so as to prevent a waste of paper and readily check an image to be printed during each process in a printing operation.

However, a proof image displayed on a monitor conventionally used only to grasp the pattern in an image to be printed or a rough entire image. The colors in a print image and the finish of the print image including the ink thickness or the like are checked by actually printing the image with a printing machine. Since the preferred ink thickness varies depending on print media such as newspaper, advertisement, poster, or magazine, a user manually opens and closes the ink key of a printing machine to adjust the printing density until desired print colors are obtained, while operating the printing machine to repeatedly perform test printing when a print image is formed. Therefore, a certain skill is required to adjust ink printing density, and a large amount of paper waste is generated in the end. The amount of paper waste generated before the final ink printing density is determined is almost the same, regardless of the number of copies to be printed. The paper waste generation rate becomes higher, if the number of copies to be printed becomes smaller. Therefore, in a digital printing machine for fewer lots and more variety, the period of time required to determine the final ink printing density should be shortened to achieve high speed, and generation of paper waste should be reduced to lower costs.

To counter those problems, Japanese Patent Application Publication No. 2001-347645 discloses a technique for displaying a predicted image on a monitor. The predicted image is formed by predicting a print image based on the opening of the ink key for adjusting the ink printing density and the pixel values of image data. Japanese Patent Application Publication No. 2004-106523 discloses a technique for setting a target color that is a sample color printed by a reference printing machine already subjected to a color adjustment, and automatically adjusting the ink printing density so that each image printed by a printing machine to be adjusted has a similar color to the target color. By the technique disclosed in Japanese Patent Application Publication No. 2001-347645, the colors in each image to be printed can be roughly checked prior to printing, and accordingly, the processing time required to determine the final ink printing density can be shortened. By the technique disclosed in Japanese Patent Application Publication No. 2004-106523, the ink printing density can be automatically adjusted so as to reproduce the sample color printed by the reference printing machine.

However, even if the ink printing density is adjusted to obtain a print color similar to the target color by the techniques disclosed in Japanese Patent Application Publication Nos. 2001-347645 and 2004-106523, there might be a request to make a quick change in the print color, as a result of a check made by a client on a predicted image displayed on a monitor or test print image. Particularly, a request for color correction on each of the image components in a print image is often made. In such a case, the print colors are adjusted by manually changing the ink printing density, and test printing is repeated until a print image satisfying the client's request is obtained. Therefore, a large amount of paper waste is generated, and it is still difficult to adjust the color of each image component in a print image to a desired print color through the adjustment of the ink printing density.

SUMMARY OF THE INVENTION

The present invention has been made in view of the circumstances and provides an image data correcting device and a computer-readable data correcting program storage medium that can reduce generation of paper waste and produce a desired color for each of the image components in a print image.

An image data correcting apparatus according to the invention includes:

an image data obtaining section that obtains print image data representing a print image in which a plurality of images are arranged, the print image to be printed by a printing system in which printing densities for inks of a plurality of colors are set respectively and the inks are supplied at the printing densities respectively so that an image is printed based on an image data;

an area designation receiving section that receives a designating operation to designate an area in the print image represented by the print image data obtained by the image data obtaining section;

a density adjusting section in which an adjustment value is designated through an operation for the printing density;

a change estimating section that estimates a change in a print color in the printing system that is caused by an adjustment of the printing densities according to the adjustment values designated by the density adjusting section; and a data correcting section that corrects the print image data to cancel the change estimated by the change estimating section in an other area other than the region designated through the designating operation in the print image.

In the image data correcting device of the present invention, the printing density of each of the inks is adjusted so as to produce a desired print color in the designated region in the print image. As for the other area other than the designated area in the print image, the print image data is corrected to reproduce the print colors obtained when the inks are supplied at the unadjusted printing density. Accordingly, a print image having print color suitable for the respective areas can be formed, and a visually desirable print image can be easily produced.

In the image data correcting apparatus according to the invention, it is preferable that the image data correcting apparatus further includes an image display section that reproduces the print image based on the print image data and displays the print image on a display screen, wherein the area designation receiving section receives a designating operation to designate an area in an image formed by reproducing the print image in the image display section.

By designating the region having the important color in an image displayed on the display screen, a user can easily designate an area having a print color to be changed. In the image data correcting apparatus according to the invention, it is preferable that the print image has a plurality of images arranged on a page and the area designation receiving section receives a designation operation to designate as the area at least one of the plurality of images.

In this preferred image data correcting device, a print image having print colors suitable for the respective image components can be formed.

In the image data correcting apparatus according to the invention, it is preferable that the print image includes a spot color and the area designation receiving section receives a designating operation to designate as the area an area including the spot color in the print image.

In the field of printing, it is expected that an important color (a spot color) such as the "corporate color" of a company is reproduced in printing with high precision. In this preferred image data correcting device, a spot color in a print image can be reproduced with high precision, and the colors other than the spot color in the print image can also be accurately reproduced.

In the image data correcting apparatus according to the invention, it is preferable that the image data correcting apparatus further includes:

a function obtaining section that obtains a first density function of calculating a print color of a print image that is printed in such a manner that the input image data is input, the inks of the plurality of colors are supplied at the printing densities adjusted according to the adjustment values designated by the density adjusting section in the printing system, and the print image is printed based on the image data, a second density function of calculating a print color of a print image that is printed in such a manner that the input image data is input, the inks of the plurality of colors are supplied at the printing densities unadjusted according to the adjustment values designated by the density adjusting section in the printing system, and the print image is printed based on the image data, and an inverse function of the first density function, wherein the change estimating section, by assigning image data representing the area in the print image designated through the designating operation to the first density function, estimates a print color in the area when the printing densities are adjusted according to the adjustment values, and the data correcting section, by assigning image data representing the other area other than the area designated through the designating operation to a composite function of the second density function and the inverse function, calculates image data for reproducing the print color by the printing system in which a printing density is adjusted, the print color by the printing system in which a printing is unadjusted, and corrects an image data portion representing the other area in the print image data to the calculated image data.

The first density function, the second density function, and the inverse function of the first density function are obtained in advance, and a data conversion is carried out with the use of the obtained density functions by the time when actual printing is performed. Accordingly, the processing time can be shortened.

According to the invention, a computer-readable image data correcting program storage medium that stores an image data correcting program to be executed in a computer to construct in the computer:

an image data obtaining section that obtains print image data representing a print image in which a plurality of images are arranged, the print image to be printed by a printing system in which printing densities for inks of a plurality of colors are set respectively and the inks are supplied at the printing densities respectively so that an image is printed based on an image data;

an area designation receiving section that receives a designating operation to designate an area in the print image represented by the print image data obtained by the image data obtaining section;

a density adjusting section in which an adjustment value is designated through an operation for the printing density;

a change estimating section that estimates a change in a print color in the printing system that is caused by an adjustment of the printing densities according to the adjustment values designated by the density adjusting section; and a data correcting section that corrects the print image data to cancel the change estimated by the change estimating section in an other area other than the region designated through the designating operation in the print image.

With the computer-readable image data correcting program storage medium of the present invention, it is possible to form a data correcting device that can reduce generation of paper waste and produce desired colors for the respective image components in a print image.

Only the fundamental structure of the computer-readable image data correcting program storage medium is described here to avoid repetitive explanation. The computer-readable image data correcting program storage medium according to the present invention is not limited to the fundamental structure, and has various embodiments corresponding to the respective embodiments of the image data correcting device.

Each of the components such as the image data obtaining section to be formed in a computer system by the image data correcting program of the present invention may be a program component, or some of the components may be formed with one program component. Those components may be self-executed to obtain the respective functions, or may be executed by giving instructions to some other program or program component incorporated into the computer system.

According to the present invention, generation of paper waste can be reduced, and a desired color can be obtained for each of the image components in a print image.

DESCRIPTION OF PREFERRED EMBODIMENTS

Embodiments of the present invention will be described with reference to the accompanying drawings.

Figure 1:
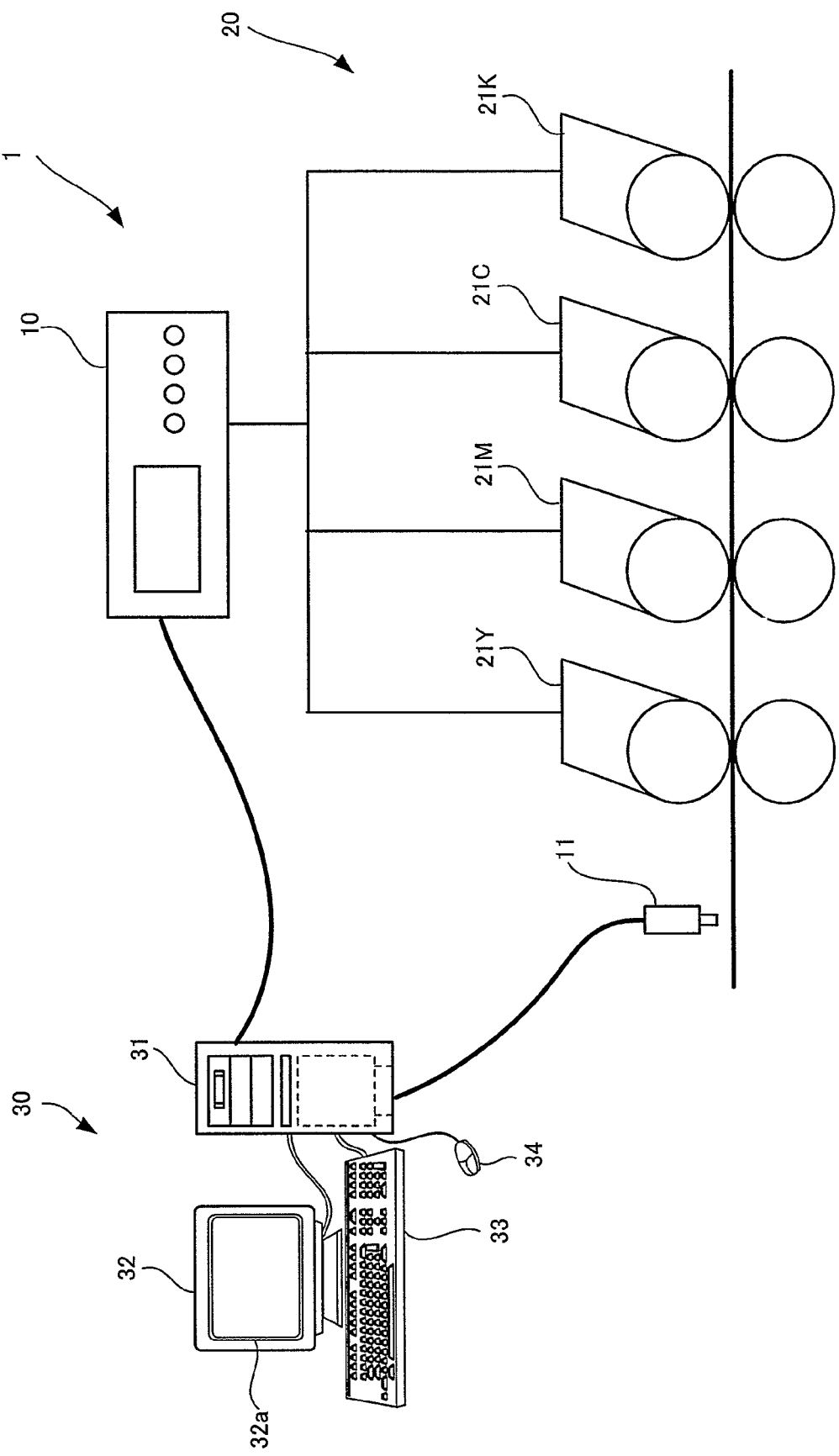
FIG. 1 illustrates an entire structure of a printing system into which an embodiment of the present invention is incorporated.

FIG. 1 illustrates an entire structure of a printing system into which an embodiment of the present invention is incorporated.

A printing system 1 shown in FIG. 1 includes: a printing machine 20 that produces a print image with the use of inks of C, M, Y, and K colors; a workstation 30 that generates print image data representing the print image; a control device 10 that controls the print density of the C, M, Y, and K inks in the printing machine 20; and a calorimeter 11 that measures the colors in the print image. In practice, a color scanner that reads original images and a printer that prints out images based on image data and the like are connected to the printing system 1, but are not shown in FIG. 1.

The workstation 30 receives color separation image data of R, G, and B obtained by reading an original document with a color scanner (not shown), color separation image data of the four colors of C, M, Y, and K created with the use of a personal computer or the like, color separation image data of the three colors of L*, a*, and b* obtained by capturing an image of an object with a digital camera, and the likes. An operator or the like uses the workstation 30 to edit a print image by inputting characters or arranging multiple images each represented by each of plural pieces of color separation image data, and to generate print image data representing the print image. The printing machine 20 expresses colors through combinations of the four color inks of C, M, Y, and K. The workstation 30 generates the print image data formed with the color data of the four colors of CMYK.

The printing machine 20 includes a CTP (not shown) that forms plates of respective colors of C, M, Y, and K, and image forming sections 21Y, 21M, 21C, and 21K that have the plates mounted thereto and have inks applied to the plates, so as to form colorplate images of C, M, Y, and K on paper sheets. The calorimeter 11 that measures the colors in the print image on each paper sheet is provided on the downstream side of the image forming sections 21Y, 21M, 21C, and 21K. When print image data is transmitted to the printing machine 20, the plates of C, M, Y, and K are formed based on the print image data, and the plates of C, M, Y, and K are attached to the image forming sections 21Y, 21M, 21C, and 21K. In the image forming sections 21Y, 21M, 21C, and 21K, inks each having ink print density controlled by the control device 10 are applied onto the plates, and are then transferred one by one onto a paper sheet. In this manner, the color plate images of the respective colors of C, M, Y, and K are superimposed on one another on the paper sheet, and a print image is completed.

The preferred ink printing density varies depending on the type of the print medium (such as newspaper, magazine, or advertisement) and the type of the image formed on the print image (such as a photograph, illustration, or poster), and the surface light reflection also varies depending on the type of the print medium. Therefore, even if the same amount of ink of the same color is supplied for each print image, there are differences in the color among the print images. In the workstation 30, when the type of the print medium and the type of image are designated through an instruction from a user, the ink printing density is determined in accordance with the contents of the instruction, and an image predicted to be obtained as a print image when the ink is supplied at the determined ink printing density is displayed on a display screen 32a. The user checks the predicted image displayed on the display screen 32a, and adjusts the ink printing density. In the workstation 30, an image predicted to be obtained as a print image when the ink is supplied at the adjusted printing density is displayed. The adjustment of the ink printing density and the display of a predicted image is repeated until the user decides that the desired color is shown in the predicted image.

When the adjustment of the ink printing density is ended, and the user inputs an instruction to start printing, the control device 10 is notified of the calculated printing density. In the control device 10, the opening and closing of each of the ink pots of the image forming sections 21Y, 21M, 21C, and 21K are adjusted so as to set the printing density of each of the CMYK inks.

After the printing density of each ink is set, the image forming sections 21Y, 21M, 21C, and 21K perform test printing. The calorimeter 11 then measures the colors in the print image formed through the test printing. The control device 10 then repeats test printing while finely adjusting the printing density of each ink. When the measured color values transmitted from the colorimeter 11 become equal to target color values, the printing density of each of the inks stabilizes. The workstation 30 then notifies the control device 10 of a start of printing, and actual printing is performed, instead of test printing.

However, color adjustments and the likes should be completed by the time of editing the print image, and after the prior confirmation with the use of a predicted image displayed on the display screen 32a immediately before printing, the printing should be performed instantly when a command to start printing is received. In practice, however, there might be requests for color corrections to change the print colors in some of the images arranged on the print image or in a part of an area in the print image independently. If the ink printing density is changed to realize the print colors in accordance with the requests in such cases, the print colors in the regions other than the designated region are changed. In the embodiment, in the workstation 30, print image data can be corrected in such a manner that the ink printing density is changed to obtain the print colors in accordance with each request in a designated region, and the print colors in the regions other than the designated region can be maintained at the original printing density. Thus, preferred print colors in all the regions in the print image can be realized.

In the following, procedures to be carried out by the workstation 30 will be described in detail.

As shown in FIG. 1, the workstation 30 is a large-sized personal computer that includes, as an appearance configuration, a main device 31, an image display device 32 that displays an image on the display screen 32a in accordance with an instruction from the main device 31, a keyboard 33 that inputs various kinds of information to the main device 31 through key operations, and a mouse 34 that designates a given position on the display screen 32a so as to input an instruction in accordance with an icon or the like displayed at the position.

Figure 2:
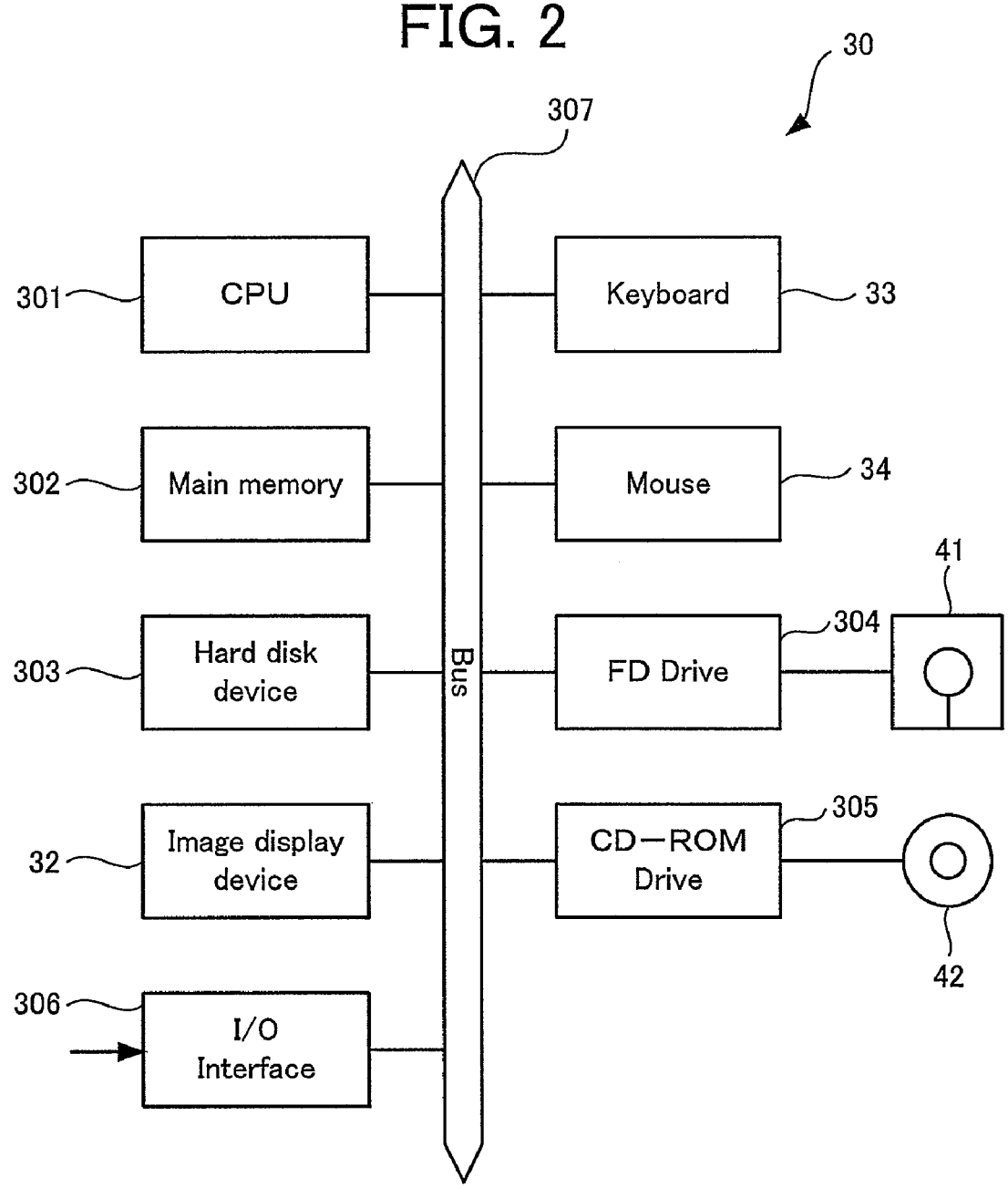
FIG. 2 illustrates a hardware structure of a workstation.

FIG. 2 illustrates a hardware structure of the workstation 30.

As shown in FIG. 2, the main device 31 of the workstation 30 includes: a CPU 301 that executes various kinds of programs; a main memory 302 into which a program read from a hard disk device 303 is loaded for execution by the CPU 301; the hard disk device 303 that stores various kinds of programs, data, and the likes; a FD drive 304 into which a FD 41 is loaded, and which accesses the FD 41; a CD-ROM drive 305 that accesses a CD-ROM 42; and an I/O interface 306 that receives image data and the likes from the management server 20, and transmits various kinds of instruction data to the management server 20. Those components shown in FIG. 2 and the image display device 32, the keyboard 33, and the mouse 34 also shown in FIG. 1 are interconnected via a bus 307.

A printing density adjusting program 100 (see FIG. 3) is stored in the CD-ROM 42 as an embodiment of a computer-readable image data correcting program storage medium of the present invention.

Figure 3:
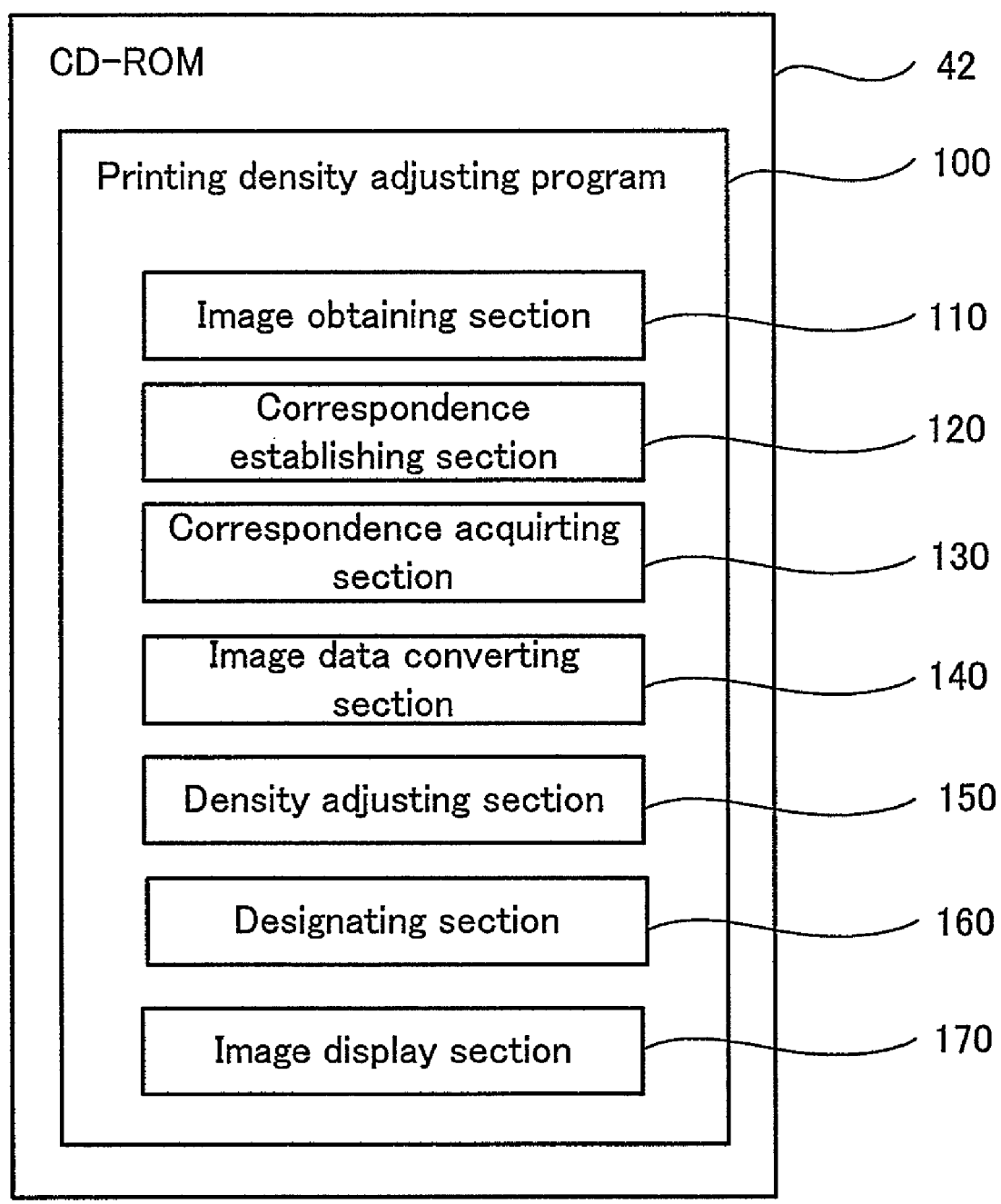
FIG. 3 is a conceptual view of a CD-ROM.

FIG. 3 is a conceptual view of the CD-ROM 42.

As shown in FIG. 3, the printing density adjusting program 100 stored in the CD-ROM 42 includes an image obtaining section 110, a correspondence establishing section 120, a correspondence acquiring section 130, an image data converting section 140, a density adjusting section 150, a designating section 160, and an image display section 170.

The CD-ROM 42 is mounted in the CD-ROM drive 305 of the workstation 30, and the printing density adjusting program 100 stored in the CD-ROM 42 is uploaded into the workstation 30 and is stored in the hard disk device 303. As the printing density adjusting program 100 is activated and executed, a printing density adjusting device 200 (see FIG. 4) as an embodiment of an image data correcting device of the present invention is constructed in the workstation 30.

In the description, the CD-ROM 42 is described as a storage medium to store the printing density adjusting program 100. However, the storage medium to store the printing density adjusting program 100 is not limited to a CD-ROM, but may be some other storage medium such as an optical disk, a MO, a FD, or magnetic tape. The printing density adjusting program 100 may also be provided directly to the workstation 30 from the I/O interface 306, not through a storage medium.

The parts of the printing density adjusting program 100 will be described in conjunction with the functions of the respective components of the printing density adjusting device 200.

Figure 4:
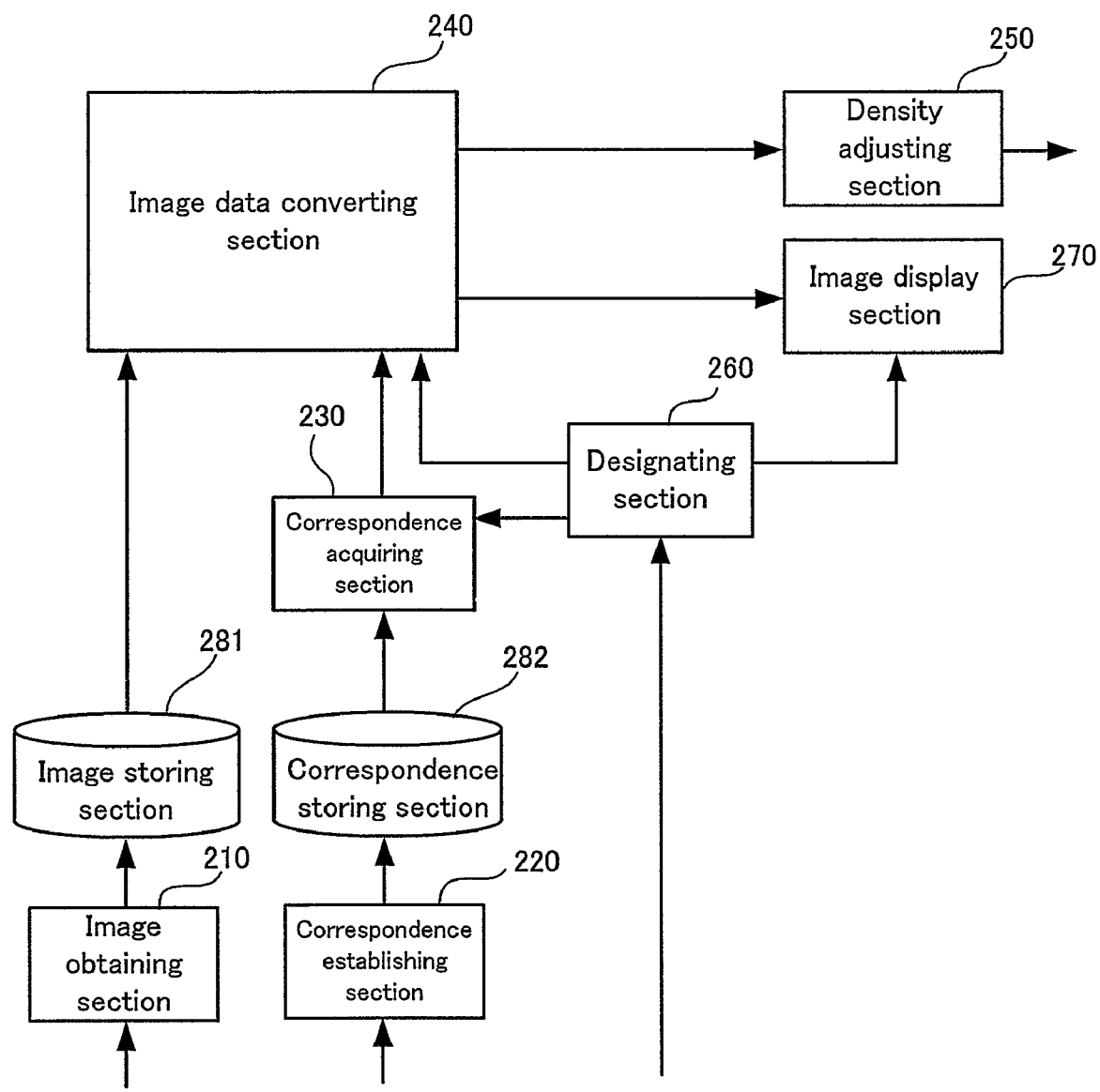
FIG. 4 is a functional block diagram of a printing density adjusting device.

FIG. 4 is a functional block diagram of the printing density adjusting device 200.

The printing density adjusting device 200 includes an image obtaining section 210, a correspondence establishing section 220, a correspondence acquiring section 230, an image data converting section 240, a density adjusting section 250, a designating section 260, an image display section 270, an image storing section 281, and a correspondence storing section 282.

The image obtaining section 210, the correspondence establishing section 220, the correspondence acquiring section 230, the image data converting section 240, the density adjusting section 250, the designating section 260, and the image display section 270 of the printing density adjusting device 200 respectively correspond to the image obtaining section 110, the correspondence establishing section 120, the correspondence acquiring section 130, the image data converting section 140, the density adjusting section 150, the designating section 160, and the image display section 170 of the printing density adjusting program 100 shown in FIG. 3.

The respective components shown in FIG. 4 are formed with combinations of the hardware of a computer and an OS or application program to be executed by the computer, while the respective parts of the printing density adjusting program 100 are constructed only by the application program.

Figure 5:
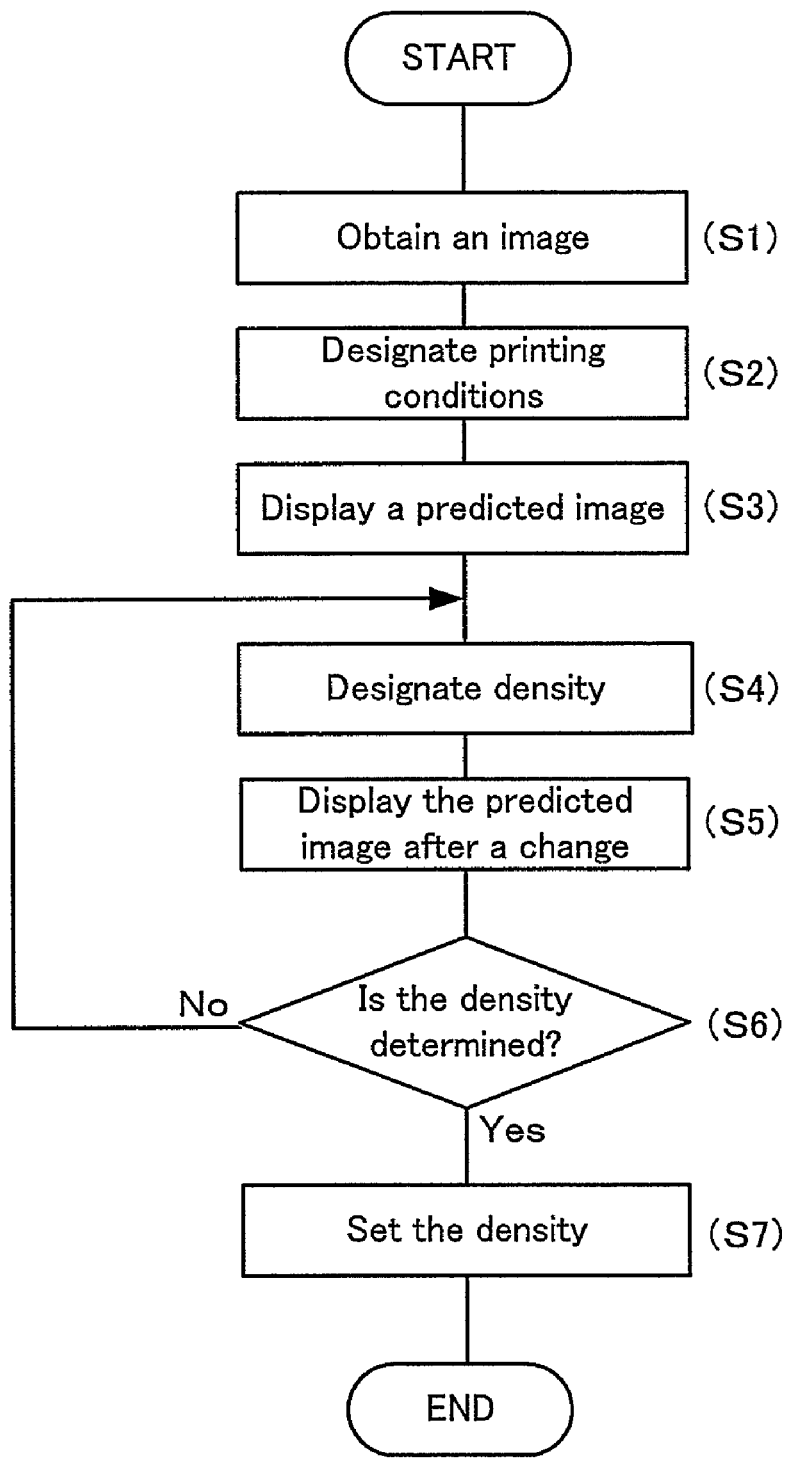
FIG. 5 is a flowchart showing a series of procedures to set an ink printing density.

FIG. 5 is a flowchart showing a series of procedures to be carried out in the printing density adjusting device 200 shown in FIG. 4 until the printing density of each ink of the printing machine 20 is set.

Referring now to the flowchart shown in FIG. 5, the operation of each component in the printing density adjusting device 200 shown in FIG. 4 will be described in conjunction with the functions of the respective parts of the printing density adjusting program 100 shown in FIG. 3.

The image obtaining section 210 shown in FIG. 4 obtains print image data edited by an operator using the workstation 30 (step S1 of FIG. 5). As described above, in the embodiment, print image data that is formed with color data of the four colors of CMYK and has an identification number allotted to each of the images arranged on the print image is generated. The image obtaining section 210 corresponds to an example of the image data obtaining section in the claims.

Figure 6:
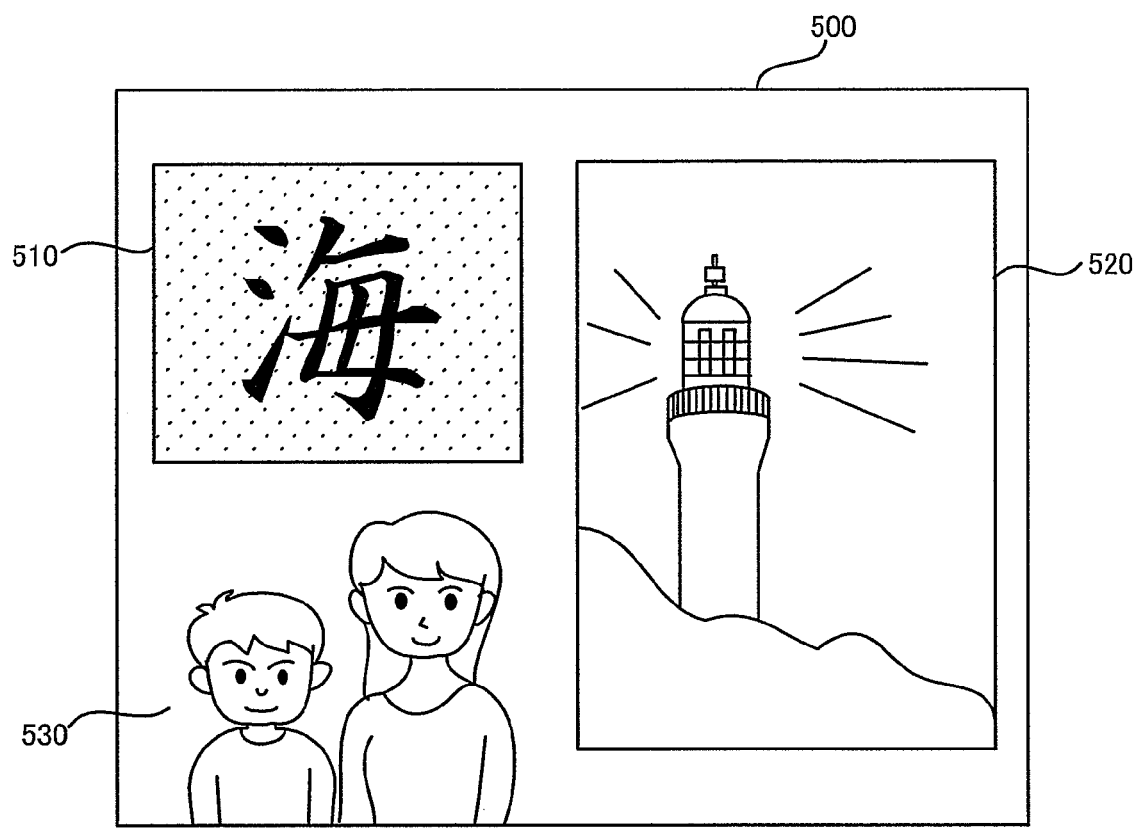
FIG. 6 shows an example of a print image represented by print image data.

FIG. 6 shows an example of the print image represented by the print image data.

The print image 500 shown in FIG. 6 has three images 510, 520, and 530 arranged in different positions. The print image data representing the print image 500 includes the image data portions representing the respective images 510, 520, and 530, and the information about the positions of the respective images 510, 520, and 530.

The print image data obtained by the image obtaining section 210 of FIG. 4 is stored in the image storing section 281.

When a user starts actual printing, the user uses the mouse 34 or the like to select a printing condition designating icon provided in the workstation 30 in advance. The designating section 260 then gives a command to display a printing condition designating screen to the image display section 270. The image display section 270 displays a predetermined printing condition designating screen (not shown) on the display screen 32a.

In accordance with the printing condition designating screen displayed on the display screen 32a, the user designates printing conditions such as the type of the print medium (such as newspaper, advertisement, magazine, or poster) and the type of the principal image among the images arranged on the print image (such as a photograph, illustration, or poster) (step S2 of FIG. 5). The designating section 260 notifies the density calculating section 240 of the designated conditions.

The ink supply density of each ink suitable for each of the printing conditions is stored in the correspondence storing section 282 prior to printing.

Prior to printing, the correspondence establishing section 220 creates a print profile that indicates the correspondences between the image data (C, M, Y, K) for printing and the predicted print colors (L*, a*, b*) of the print image to be formed by the printing machine 20 based on image data, and a display profile that indicates correspondences between the image data (R, G, B) for the display screen 32a and the measured color values (L*, a*, b*) of the display image to be displayed on the display screen 32a based on image data. Explanation of the flowchart shown in FIG. 5 is now suspended, and a method of creating each of the profiles will be described.

To generate the print profile, the control device 10 shown in FIG. 1 first adjusts the ink printing density in the printing machine 20 to the standard printing density in which when a print image generated based on print image data having 100% as the dot % value of each of C, M, Y, and K, print colors of the print image become predetermined standard colors. Hereinafter, the situation where the ink printing density is set at the standard printing density will be referred to as the standard state.

As the printing machine 20 is set to the standard state, the printing machine 20 prints out chart images on which patches of different colors from one another are arranged based on predetermined chart image data. Thus, the color of each patch of the printed chart image is then measured by the colorimeter.

The ink printing density of each of the colors C, M, Y, and K with respect to the standard printing density is respectively changed to −0.2, −0.1, +0.1, and +0.2 in optical density. In this condition, chart images are printed out based on the chart image data. Hereinafter, the situation where the ink printing density is changed from the standard printing density will be referred to as the changed state. In this example, sixteen chart images in total are printed out, with the respective colors of CMYK being put into the changed state in which the "standard printing density of C is −0.2", the "standard printing density of M is −0.1", the "standard printing density of Y is +0.1", and the "standard printing density of K is +0.2". The color of each patch on the generated chart images is also measured.

Here, the print color R of a patch obtained when the ink printing density of each of CMYK is changed by a desired amount with respect to the standard printing density can be approximately determined by the following equation:

$$R = R(\text{std}) + R_{\Delta C} + R_{\Delta M} + R_{\Delta Y} + R_{\Delta K} \quad (1)$$

where R (std) represents measured color value of the patch printed by the printing machine 20 set in the standard state, $R_{\Delta C}$ represents difference between measured color value of the patch printed when only the ink printing density of the color C is changed and the measured color value of the patch printed at the standard printing density, $R_{\Delta M}$ represents the difference between the measured color value of the patch printed when only the ink printing density of the color M is changed and the measured color value of the patch printed at the standard printing density, $R_{\Delta Y}$ represents the difference between the measured color value of the patch printed when only the ink printing density of the color Y is changed and the measured color value of the patch printed at the standard printing density, and $R_{\Delta K}$ represents the difference between the measured color value of the patch printed when only the ink printing density of the color K is changed and the measured color value of the patch printed at the standard printing density. By assigning the measured color value of each of the chart image printed in the standard state and the sixteen chart images in the changed state to the equation (1), the correspondences between the ink printing density (the standard printing density±a change) and the print color R of each patch can be obtained. Accordingly, the print color of each patch can be predicted from the dot % value and the ink printing density of the patch. Also, an interpolation for the ink printing density is performed to calculate the print color R corresponding to the ink printing density having a small change. Further, an interpolation is performed for the dot % value of each patch so that the print color R of multiple colors are calculated.

In the embodiment, a print profile is generated in which for each of the changed ink printing densities, the image data (C, M, Y, K) for printing are associated with the predicted print colors (L*, a*, b*). The conversion function F representing the print profile can be expressed as:

$$Fn(CMYK) = L^*a^*b^* \quad (2)$$

where n represents the ink printing density. The print profile is stored in the correspondence storing section 282.

To generate the display profile, color data in which the values of R, G, and B are sequentially varied is generated as the image data for the display screen 32a. A color patch image based on the color data generated in such way is displayed on the display screen 32a via the image display device 32. The color of each of the color patches forming the displayed color patch image is measured by the calorimeter, to obtain the L*, a*, and b* values that are the measured values in the correspondence establishing section 220. The correspondence establishing section 220 associates the obtained L*, a*, and b* values with the R, G, and B values of the color data, and creates the display profile that indicates the correspondences between the image data (R, G, B) for the display screen 32a and the measured color values (L*, a*, b*) The conversion function Q representing the display profile can be expressed as:

$$Q(RGB) = L^*a^*b^* \quad (3)$$

The display profile is also stored in the correspondence storing section 282.

Explanation of the flowchart shown in FIG. 5 is now resumed.

As the printing conditions are designated by the user (step S2 of FIG. 5), the designating section 260 notifies the correspondence acquiring section 230 of the printing conditions.

The correspondence acquiring section 230 obtains the display profile and the print profile corresponding to the ink printing density satisfying the designated printing conditions from the print profiles stored in the correspondence storing section 282. The obtained display profile and print profile are transmitted to the image data converting section 240.

The image data converting section 240 obtains the print image data stored in the image storing section 281, and converts the print image data into the display image data for the display screen 32a, using a combined profile formed by combining the print profile and the display profile. More specifically, according to the equation (2) described above, the print image data (CMYK) is converted into the common color data (L*a*b*) independent of the device. According to the equation (3) described above, the converted common color data (L*a*b*) is further converted into the display image data (RGB). The display image data represents a predicted image of the print image to be generated by supplying the ink printing density satisfying the printing conditions to the printing machine 20. The display image data is transmitted to the image display section 270, and the predicted image represented by the display image data is displayed on the display screen 32a (step S3 of FIG. 5).

Figure 7:
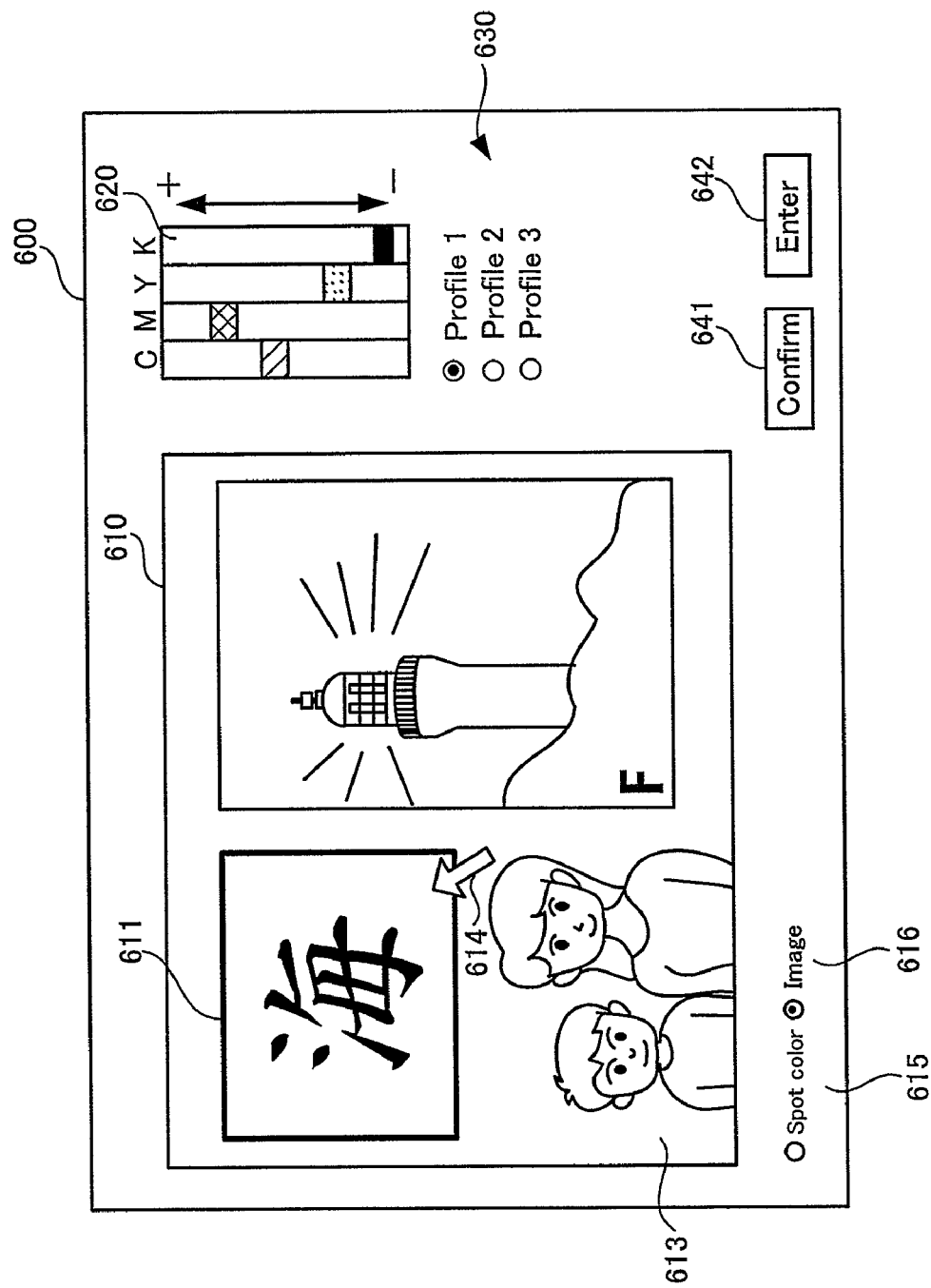
FIG. 7 shows an example of a predicted image display screen.

FIG. 7 shows an example of the predicted image display screen.

The predicted image display screen 600 shown in FIG. 7 displays a predicted image 610 of a print image, and is used to change the ink printing density. The predicted image display screen 600 includes the predicted image 610, a printing density adjusting section 620 for manually adjusting the ink printing density, a profile selecting section 630 for selecting a print profile from the plural print profiles stored in the correspondence storing section 282, a spot color button 615 for selecting a spot color region in the predicted image 610, an image button 616 for selecting an image having a print color to be changed from the images 610, 611, and 613 arranged on the predicted image 610, a confirmation button 641 for generating a predicted image of the print image when the setting is confirmed and the new ink printing density is supplied, and an execution button 642 for instructing a start of printing.

At this point, the ink printing density satisfying designated printing conditions is automatically determined through designating the printing conditions by the user. In FIG. 7, the predicted image 610 of the print image to be obtained when the determined ink printing density is provided to the printing machine 20 is displayed, and the present ink printing density is shown by the printing density adjusting section 620. The profile selecting section 630 indicates the print profile used to generate the predicted image 610. The entire predicted image 610 appears to have preferable colors. However, when each of the images 611, 612, and 613 is viewed individually, or when attention is paid to a color of an important logo image, there might be needs to partially correct the colors.

For example, in a case where the print colors of only the image 611 located at the upper left side among the images 611, 612, and 613 on the predicted image 610 are to be corrected, the user uses a pointer 614 to select the image button 616. The user then uses the profile selecting section 630 to select a new print profile to convert the print colors of the image 611, or manually adjusts the printing density adjusting section 620 to directly designate the ink printing density (step S4 of FIG. 5). The designating section 260 notifies the correspondence acquiring section 230 and the image data converting section 240 of the contents of the designation. The designating section 260 corresponds to an example of the region designation receiving section of the invention, and corresponds to an example of the density adjusting section of the invention.

The correspondence acquiring section 230 obtains the print profile F_old used to generate the predicted image 610 shown in FIG. 7, from the correspondence storing section 282. The print profile F_old is then transmitted to the image data converting section 240. A print profile F_new corresponding to the new ink printing density designated through the screen shown in FIG. 7 is further obtained. The print profile F_new is also transmitted to the image data converting section 240. More specifically, in a case where a print profile is selected through the profile selecting section 630 shown in FIG. 7, the selected print profile is obtained as the new print profile F_new. In a case where the ink printing density is designated through the printing density adjusting section 620, the print profile corresponding to the designated ink printing density is obtained as the new print profile F_new. The new print profile F_new corresponds to an example of the first density function of the invention, and the original print profile F_old corresponds to an example of the second density function of the invention.

Based on the print profile F_new corresponding to the adjusted ink printing density, the image data converting section 240 first calculates an inverse conversion profile F_new$^{-1}$ representing an inverse function of the conversion function represented by the print profile F_new. According to the equation (2), the print profile F_new is expressed as:

$$F\_new(CMYK)=L*a*b* \qquad (4)$$

As a result, the inverse conversion profile F_new$^{-1}$ that is expressed below is calculated:

$$CMYK'=F\_new^{-1}(L*a*b*) \qquad (5)$$

This inverse conversion profile F_new$^{-1}$ corresponds to an example of the inverse function of the invention. The inverse conversion profile F_new$^{-1}$ can be generated by the Newton's method of successive approximation, which has been widely used. Therefore, explanation of the generation of the inverse conversion profile F_new$^{-1}$ is not repeated in this specification. A combination of the correspondence establishing section 220 and the image data converting section 240 corresponds to an example of the change estimating section of the invention.

According to the equation (2), the print profile F_old corresponding to the original ink printing density prior to the adjustment is expressed as:

$$F\_old(CMYK)=L*a*b* \qquad (6)$$

As the equation (6) is assigned to the equation (5), the following equation is established:

$$CMYK'=F\_new-1\{F\_old(CMYK)\} \qquad (7)$$

The equation (7) is a composite function that converts the original image data (CMYK) for printing into predicted print colors (L*a*b*) in accordance with the print profile F_old corresponding to the original ink printing density prior to the adjustment, and converts the predicted print colors (L*a*b*) into new image data (CMYK) for printing so as to maintain the predicted print colors at the new ink printing density in accordance with the inverse conversion profile F_new$^{-1}$ of the print profile F_new corresponding to the new ink printing density.

The image data converting section 240 obtains new pixel values (CMYK') by assigning the respective pixel values (CMYK) of the non-designated image data portion of the print image data to the composite function expressed by the equation (7). The non-designated image data portion of the print image data is the portion other than the designated image data portion corresponding to the image 611 designated for a color correction of the print image data. The image data converting section 240 further generates new print image data that has the new pixel values (CMYK') replacing the non-designated image data portion of the print image data. The new print image data is corrected so as to cancel the changes caused by the adjustment of the ink printing density in the colors in the original print image formed at the ink printing density prior to the adjustment, in the regions other than the region corresponding to the image 611 designated for the color correction. Accordingly, inks at the adjusted printing density are supplied to the printing machine 20, and a print image is generated based on the new print image data. In this manner, the image 611 designated for the color correction made thereon is shown in the print colors at the adjusted printing density, while the regions other than the image 611 maintain the print colors at the unadjusted printing density. The image data converting section 240 is equivalent to the data correcting section in the claims.

The new print image data is converted into display image data with the use of a print profile F2 and a display profile Q at the adjusted printing density in the same manner as in step S2 of FIG. 5. The display image data is transmitted to the image display section 270.

The image display section 270 displays a new predicted image represented by the display image data, instead of the predicted image 610 shown in FIG. 7 (step S5 of FIG. 5).

Figure 8:
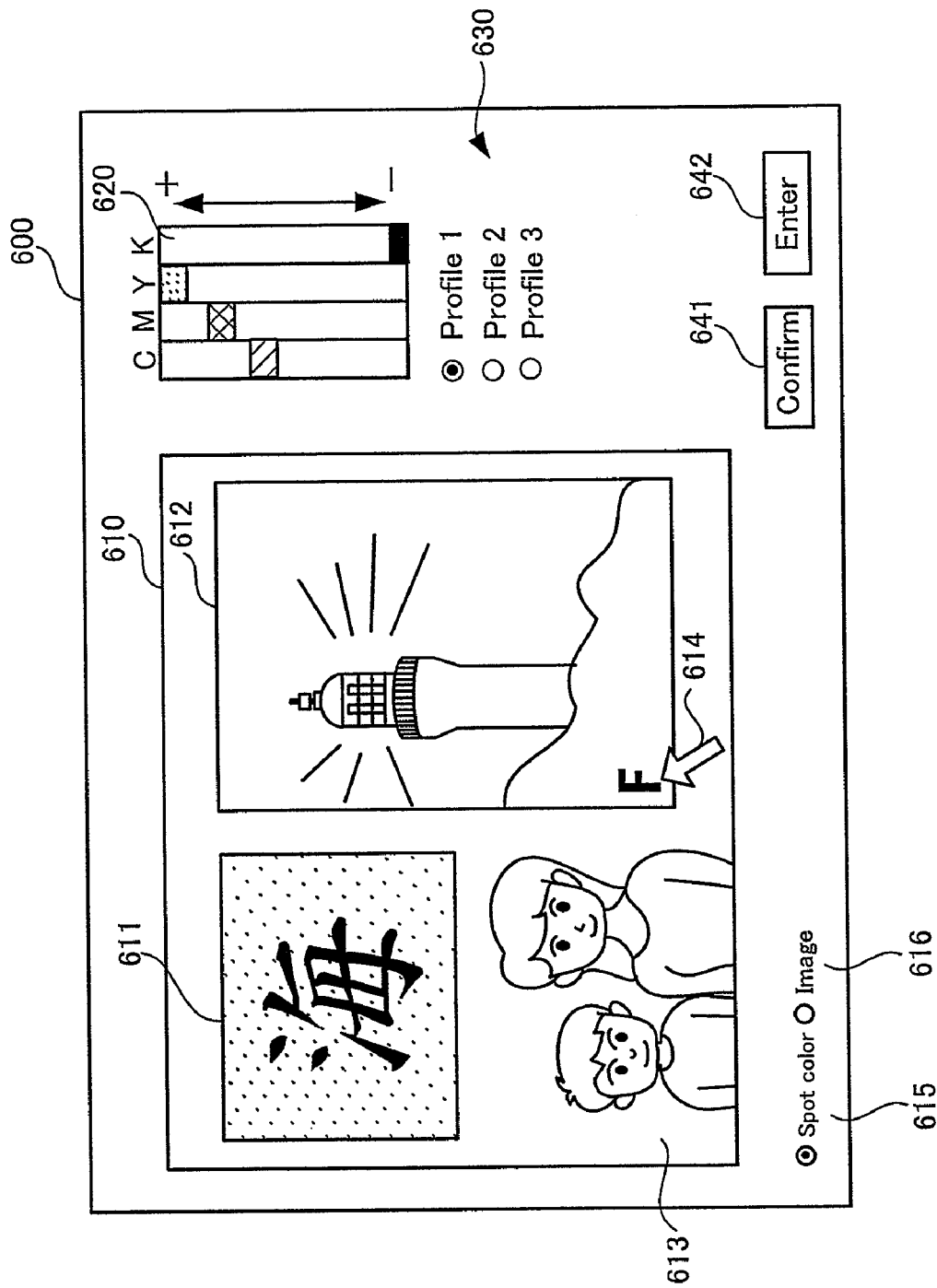
FIG. 8 shows an example of the predicted image display screen having a predicted image replaced with another predicted image.

FIG. 8 illustrates an example of the predicted image display screen showing a predicted image replacing the previous predicted image.

As shown in FIG. 8, a new predicted image 610' replacing the previous predicted image is displayed on the predicted image display screen 600. Compared with the previous predicted image 610 shown in FIG. 7, the colors of the image 611 at the upper left side in the predicted image 610', which the user designates the color correction, are corrected, and the same colors as those in the previous predicted image 610 are maintained in the regions other than the image 611.

In a case where the logo color or the like that is a spot color in the print image is to be corrected ("NO" in step S6 of FIG. 5), the user uses the pointer 614 to select the spot color button 615. The user then designates the spot or region having the color to be corrected, and designates new ink printing density (step S4 of FIG. 5).

In a case where an area is designated through the designating section 260, the image data converting section 240 replaces the non-designated image data portion of the print image data other than the designated image data portion corresponding to the designated region with new pixel values (CMYK'), according to the equation (7). In a case where a spot is designated through the designating section 260, the non-designated image data portion of the print image data other than the designated image data portion corresponding to an area having the same color as the color of the designated spot is replaced with the new pixel values (CMYK').

The new print image data is converted into display image data, and the display image data is transmitted to the image display section 270. The predicted image 610 shown in FIG. 7 is then replaced with the new predicted image (step S5 of FIG. 5).

When the user checks the predicted image displayed on the display screen 32a and selects the execution button 642, a final print image data and the adjusted ink printing density are transmitted to the density adjusting section 250. The density adjusting section 250 then transmits the print image data and the adjusted ink printing density to the control device 10. The control device 10 then sets the adjusted ink printing density of the printing machine 20 (step S7 of FIG. 5).

After the ink printing density is set, test printing is repeated, while the ink printing density is finely adjusted by the control device 10. When the color value measured by the calorimeter 11 reaches the target color value, and the ink printing density becomes stable, the workstation 30 sends a printing start instruction to the control device 10, and actual printing is performed. In the embodiment, a desired color can be obtained in each image and region on a print image, and a visually preferable print image can be readily formed. In the field of printing, it is expected that a spot color such as a logo color is stably shown in the same color, and it is essential to appropriately adjust the ink printing density, the type of ink, the type of printing sheet, and the likes. In the embodiment, the ink printing density can be designated while a predicted image of a print image is checked. Accordingly, a spot color in a print image can be accurately reproduced, and the regions other than the region having the spot color can be shown in visually preferable colors.

Although the ink printing density is set for each of the four colors CMYK in the embodiment, the ink printing density for an ink of a spot color may also be set as well as the ink printing densities of the four colors CMYK.

In the embodiment, the "three-color separation image data", the "predicted print colors of a print image", the "measured color values of a displayed image", the "predicted print colors and measured color values in the profiles generated by the correspondence establishing section 220", and the likes are expressed in a L*a*b* color space. However, the color space in which those data and values are expressed may be any color space that is independent of the device, such as a Luv color space or a XYZ color space.

What is claimed is:

1. An image data correcting apparatus comprising:
   an image data obtaining section that obtains print image data representing a print image in which a plurality of images are arranged, the print image to be printed by a printing system in which printing densities for inks of a plurality of colors are set respectively and the inks are supplied at the printing densities respectively so that an image is printed based on an image data;
   an area designation receiving section that receives a designating operation to designate an area in the print image represented by the print image data obtained by the image data obtaining section;
   a density adjusting section in which an adjustment value is designated through an operation for the printing density;
   a change estimating section that estimates a change in a print color in the printing system that is caused by an adjustment of the printing densities according to the adjustment values designated by the density adjusting section; and
   a data correcting section that corrects the print image data to cancel the change estimated by the change estimating section in an other area other than the area designated through the designating operation in the print image.

2. The image data correcting apparatus according to claim 1, further comprising:
   an image display section that reproduces the print image based on the print image data and displays the print image on a display screen, wherein
   the area designation receiving section receives a designating operation to designate an area in an image formed by reproducing the print image in the image display section.

3. The image data correcting apparatus according to claim 1, wherein
   the print image has a plurality of images arranged on a page, and
   the area designation receiving section receives a designation operation to designate as the area at least one of the plurality of images.

4. The image data correcting apparatus according to claim 1, wherein
   the print image includes a spot color, and
   the area designation receiving section receives a designating operation to designate as the area an area including the spot color in the print image.

5. The image data correcting apparatus according to claim 1, further comprising
   a function obtaining section that obtains a first density function of calculating a print color of a print image that is printed in such a manner that the input image data is input, the inks of the plurality of colors are supplied at the printing densities adjusted according to the adjustment values designated by the density adjusting section in the printing system, and the print image is printed based on the image data, a second density function of calculating a print color of a print image that is printed in such a manner that the input image data is input, the inks of the plurality of colors are supplied at the printing densities unadjusted according to the adjustment values designated by the density adjusting section in the printing system, and the print image is printed based on the image data, and an inverse function of the first density function, wherein
   the change estimating section, by assigning image data representing the area in the print image designated through the designating operation to the first density function, estimates a print color in the area when the printing densities are adjusted according to the adjustment values, and
   the data correcting section, by assigning image data representing the other area other than the area designated through the designating operation to a composite function of the second density function and the inverse function, calculates image data for reproducing the print color by the printing system in which a printing density is adjusted, the print color by the printing system in which a printing is unadjusted, and corrects an image data portion representing the other area in the print image data to the calculated image data.

6. A non-transitory computer-readable medium that stores an image data correcting program which is executed in a computer and which causes the computer to operate as an image data correcting apparatus, the image data correcting apparatus comprising:

an image data obtaining section that obtains print image data representing a print image in which a plurality of images are arranged, the print image to be printed by a printing system in which printing densities for inks of a plurality of colors are set respectively and the inks are supplied at the printing densities respectively so that an image is printed based on an image data;

an area designation receiving section that receives a designating operation to designate an area in the print image represented by the print image data obtained by the image data obtaining section;

a density adjusting section in which an adjustment value is designated through an operation for the printing density;

a change estimating section that estimates a change in a print color in the printing system that is caused by an adjustment of the printing densities according to the adjustment values designated by the density adjusting section; and a data correcting section that corrects the print image data to cancel the change estimated by the change estimating section in an other area other than the area designated through the designating operation in the print image.

7. The non-transitory computer-readable medium according to claim 6, wherein the image data correcting program to be executed in the computer further constructs in the computer an image display section that reproduces the print image based on the print image data and displays the print image on a display screen, and the area designation receiving section receives a designating operation to designate an area in an image formed by reproducing the print image in the image display section.

8. The non-transitory computer-readable medium according to claim 6, wherein the print image has a plurality of images arranged on a page, and the area designation receiving section receives a designation operation to designate as the area at least one of the plurality of images.

9. The non-transitory computer-readable medium according to claim 6, wherein the print image includes a spot color, and the area designation receiving section receives a designating operation to designate as the area an area including the spot color in the print image.

10. The non-transitory computer-readable medium according to claim 6, wherein the image data correcting program to be executed in the computer further constructs in the computer a function obtaining section that obtains a first density function of calculating a print color of a print image that is printed in such a manner that the input image data is input, the inks of the plurality of colors are supplied at the printing densities adjusted according to the adjustment values designated by the density adjusting section in the printing system, and the print image is printed based on the image data, a second density function of calculating a print color of a print image that is printed in such a manner that the input image data is input, the inks of the plurality of colors are supplied at the printing densities unadjusted according to the adjustment values designated by the density adjusting section in the printing system, and the print image is printed based on the image data, and an inverse function of the first density function, the change estimating section, by assigning image data representing the area in the print image designated through the designating operation to the first density function, estimates a print color in the area when the printing densities are adjusted according to the adjustment values, and the data correcting section, by assigning image data representing the other area other than the area designated through the designating operation to a composite function of the second density function and the inverse function, calculates image data for reproducing the print color by the printing system in which a printing density is adjusted, the print color by the printing system in which a printing is unadjusted, and corrects an image data portion representing the other area in the print image data to the calculated image data.

11. An image data correcting method comprising the steps of:

obtaining print image data representing a print image in which a plurality of images are arranged, the print image to be printed by a printing system in which printing densities for inks of a plurality of colors are set respectively and the inks are supplied at the printing densities respectively so that an image is printed based on an image data;

receiving a designating operation to designate an area in the print image represented by the print image data obtained by the image data obtaining section;

designating an adjustment value through an operation for the printing density;

estimating a change in a print color in the printing system that is caused by an adjustment of the printing densities according to the adjustment values designated by the density adjusting section; and correcting the print image data to cancel the change estimated by the change estimating section in an other area other than the area designated through the designating operation in the print image.

12. The image data correcting method according to claim 11, further comprising a step of reproducing the print image based on the print image data so as to display the print image on a display screen, wherein the receiving step is a step of receiving a designating operation to designate an area in an image formed by reproducing the print image in the image display section.

13. The image data correcting method according to claim 11, wherein the print image has a plurality of images arranged on a page, and the step of receiving is a step of receiving a designation operation to designate as the area at least one of the plurality of images.

14. The image data correcting method according to claim 11, wherein the print image includes a spot color, and the step of receiving is a step of receiving a designating operation to designate as the area an area including the spot color in the print image.

15. The image data correcting method according to claim 11, further comprising:

a step of obtaining a first density function of calculating a print color of a print image that is printed in such a manner that the input image data is input, the inks of the plurality of colors are supplied at the printing densities adjusted according to the adjustment values designated by the density adjusting section in the printing system, and the print image is printed based on the image data, a second density function of calculating a print color of a print image that is printed in such a manner that the input image data is input, the inks of the plurality of colors are supplied at the printing densities unadjusted according to the adjustment values designated by the density adjusting section in the printing system, and the print image is printed based on the image data, and an inverse function of the first density function, wherein the step of estimating is a step of estimating a print color in the area when the printing densities are adjusted according to the adjustment values, by assigning image data representing the area in the print image designated through the designating operation to the first density function, and the step of correcting is a step of calculating image data for reproducing the print color by the printing system in which a printing density is adjusted, the print color by the printing system in which a printing is unadjusted, by assigning image data representing the other area other than the area designated through the designating operation to a composite function of the second density function and the inverse function, and correcting an image data portion representing the other area in the print image data to the calculated image data.

16. A printing system comprising:

a printing apparatus in which printing densities for inks of a plurality of colors are set respectively and the inks are supplied at the printing densities respectively so that an image is printed based on an image data;

an image data obtaining section that obtains print image data representing a print image in which a plurality of images are arranged, the print image to be printed by the printing apparatus;

an area designation receiving section that receives a designating operation to designate an area in the print image represented by the print image data obtained by the image data obtaining section;

a density adjusting section in which an adjustment value is designated through an operation for the printing density;

a change estimating section that estimates a change in a print color in the printing system that is caused by an adjustment of the printing densities according to the adjustment values designated by the density adjusting section;

a data correcting section that corrects the print image data to cancel the change estimated by the change estimating section in an other area other than the area designated through the designating operation in the print image; and a density setting section that sets the printing density adjusted by the adjustment value in the printing apparatus.

17. The printing system according to claim 16, further comprising an image display section that reproduces the print image based on the print image data and displays the print image on a display screen, wherein the area designation receiving section receives a designating operation to designate an area in an image formed by reproducing the print image in the image display section.

18. The printing system according to claim 16, wherein the print image has a plurality of images arranged on a page, and the area designation receiving section receives a designation operation to designate as the area at least one of the plurality of images.

19. The printing system according to claim 16, wherein the print image includes a spot color, and the area designation receiving section receives a designating operation to designate as the area an area including the spot color in the print image.

20. The printing system according to claim 16, further comprising a function obtaining section that obtains a first density function of calculating a print color of a print image that is printed in such a manner that the input image data is input, the inks of the plurality of colors are supplied at the printing densities adjusted according to the adjustment values designated by the density adjusting section in the printing system, and the print image is printed based on the image data, a second density function of calculating a print color of a print image that is printed in such a manner that the input image data is input, the inks of the plurality of colors are supplied at the printing densities unadjusted according to the adjustment values designated by the density adjusting section in the printing system, and the print image is printed based on the image data, and an inverse function of the first density function, wherein the change estimating section, by assigning image data representing the area in the print image designated through the designating operation to the first density function, estimates a print color in the area when the printing densities are adjusted according to the adjustment values, and the data correcting section, by assigning image data representing the other area other than the area designated through the designating operation to a composite function of the second density function and the inverse function, calculates image data for reproducing the print color by the printing system in which a printing density is adjusted, the print color by the printing system in which a printing is unadjusted, and corrects an image data portion representing the other area in the print image data to the calculated image data.

* * * * *